United States Patent [19]
Shalvi

[11] Patent Number: 5,621,303
[45] Date of Patent: Apr. 15, 1997

[54] DRIVE CIRCUIT FOR A LAMP

[75] Inventor: Ram Shalvi, Hong Kong, Hong Kong

[73] Assignee: Solar Wide Industrial Ltd., Hong Kong

[21] Appl. No.: 456,700

[22] Filed: Jun. 1, 1995

[51] Int. Cl.$^6$ .................................. H02J 7/00; H01J 7/44
[52] U.S. Cl. .................. 320/30; 320/32; 320/35; 320/39; 320/13; 315/50
[58] Field of Search .................. 320/13, 30, 34, 320/32, 33, 35, 36, 39–40; 323/366, 369, 294, 908; 361/106; 315/50

[56] References Cited

FOREIGN PATENT DOCUMENTS

531438B1  3/1993  European Pat. Off. ........ H05B 41/29
1591215  6/1981  United Kingdom ........... H05B 41/29

*Primary Examiner*—Peter S. Wong
*Assistant Examiner*—K. Shin
*Attorney, Agent, or Firm*—Gunn, Lee & Miller, P.C.

[57] ABSTRACT

A drive circuit for a solar lamp includes a thermistor TH1 that reduces a power supply to a lamp if a Mosfet Q1 to which it is physically mounted becomes too hot. Also, a resistor R37 sets at low voltage level below which the battery will be isolated. This serves to set a lower but safe level than the voltage at which the circuit in block A isolates the battery during optimum operating conditions of the lamp. Such components prevent or at least inhibit the possibility of the battery being discharged beyond a level from which it cannot recover.

2 Claims, 1 Drawing Sheet

DRIVE CIRCUIT FOR A LAMP

BACKGROUND OF THE INVENTION

The invention relates to drive circuits.

The invention relates more particularly to a drive circuit for use in controlling a lamp driven by solar cells. Such lamps are used for all forms of lighting applications especially exterior light around dwelling places. The lamps are arranged to be driven by re-chargeable batteries provided with solar panels so that they rely mainly or solely on receiving charging current generated by the solar cells during day light hours.

Commonly a fluorescent tube or lamp is used and driven via an electronic ballast. Battery energy is used to provide a high frequency high voltage power source which is applied between the terminals of the lamp. The ballast consists of a multi-phase transformer with a free-running oscillator.

FR-A2561483 and GB-A2053592 disclose lamps including a solar cell and oscillator drive and using a heating element to warm up the lamp. EP-A0429716 discloses a lamp drive circuit having an oscillator, a transformer and a switch to control power supply to one of the elements; the circuit is arranged to delay application of power to the lamp at start up to allow the filament of the lamp to warm up.

In European application 9,191,479.3 a drive circuit is described which continually monitors the operations condition of the fluorescent lamp and automatically adjusts the power supply to compensate for charges and to correct the operating condition. In doing so or in any event, it has been found preferable or necessary to protect the condition of the battery especially because if some types of battery discharge beyond a certain level, they never recover.

It is an object of the invention to provide a lamp drive circuit incorporating battery condition protection arrangements.

SUMMARY OF THE INVENTION

According to the invention there is provided a lamp drive circuit for connection between a battery power supply, incorporating solar cells and a battery, and terminals of a fluorescent lamp, including an oscillator and a step-up transformer arranged to supply high frequency power across the terminals, a switch connected to control a warm up power supply to a filament of the lamp, and a battery condition protection circuit to inhibit total discharging of the battery.

The battery condition protection circuit may include a thermistor physically adjacent one of the power carrying components of the oscillator such that the thermistor significantly increases in temperature whenever high power is being supplied for more than a short period of time, and in which the thermistor is connected to the oscillator to reduce the power output automatically when the thermistor temperature rises significantly.

Where the drive circuit includes a low voltage detecting circuit which normally isolates the battery to prevent further discharge if the battery voltage is low, and circuit means for cancelling the application of the low voltage detecting circuit during certain operations of the fluorescent lamp, means for inhibiting the cancelling means can be provided whenever the voltage of the battery falls below a predetermined lower value.

DETAILED DESCRIPTION OF THE PREFERRED EMBODIMENT

Figure 1:
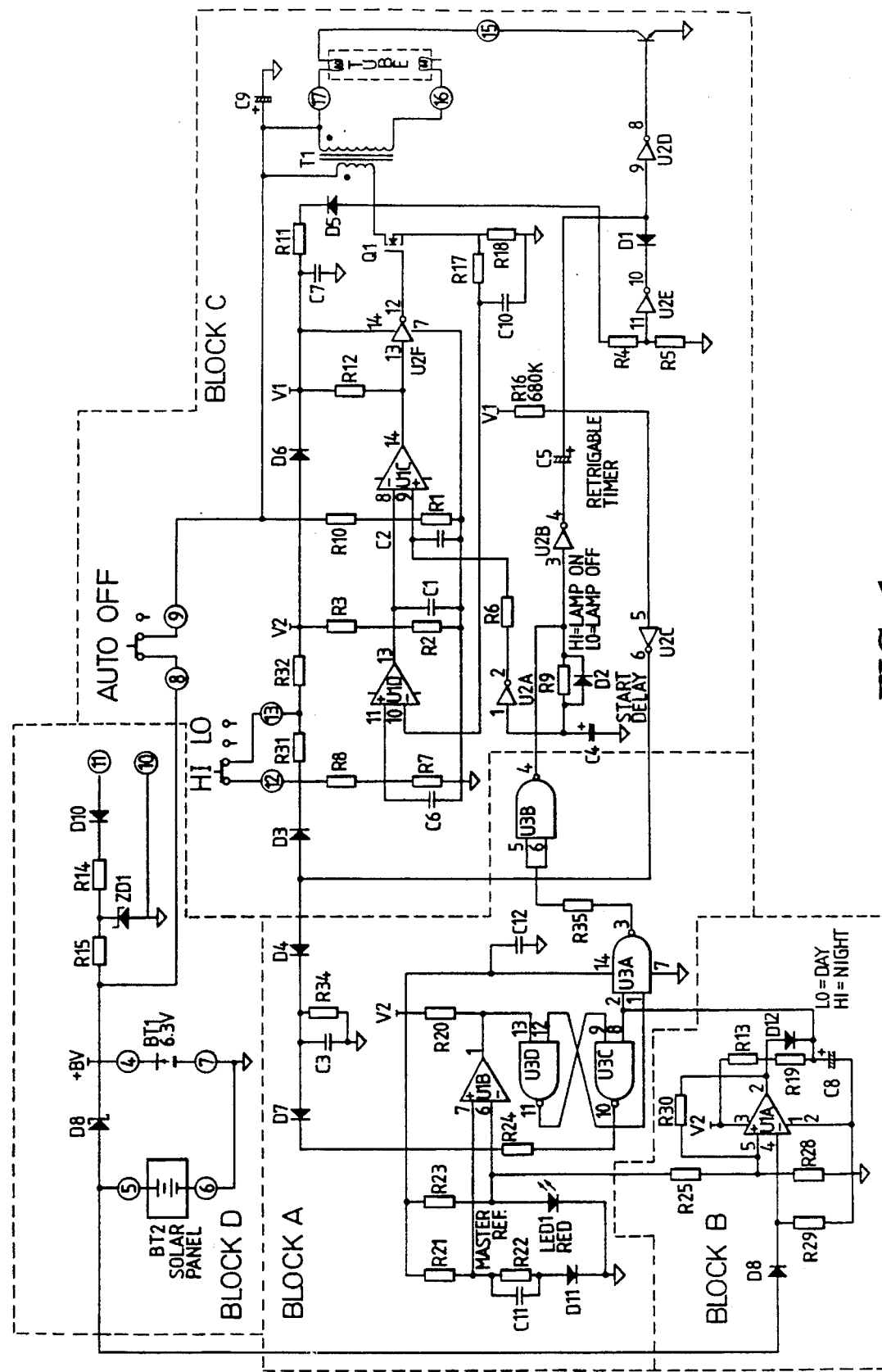
FIG. 1 is a schematic illustration of the present invention subdivided into four blocks A, B, C and D.

A lamp drive circuit according to the invention will now be described by way of example with reference to the accompanying drawings which show a circuit diagram of the drive circuit.

Referring to the drawings, the circuit is divided into blocks A, B, C and D. A full description of the circuit is provided in European Application 91911479.3 which is incorporated herein by reference. The circuit for this application includes added components TH1 and R37, as will be explained below.

Broadly, block A is a battery condition detecting circuit which is arranged to control application of power to a lamp in a manner to prevent using the battery if its charge is too low. Block B is a circuit which monitors the outside light conditions to influence the application of power accordingly. Block C is the main part of the lamp drive circuit and block D is a charging circuit but shows the battery as well as a solar panel.

Dealing with the circuits in more detail, block A includes a voltage comparator U1B with a resistor R20 connected to its output to hold up its output voltage. A latch is formed by gates U3C and U3D. The output of the latch at U3C is set to high by an output from block B. A battery voltage sampling network consists of resistors R21 and R22, diode D11 and capacitor C11. The input threshold of the sampling network is reduced after turn on by a feedback resistor R24. A master reference network consists of resistor R23 and a light emitting diode LED1 (which has a negative temperature coefficient). A diode D11 compensates for thermal drift of LED1 and a capacitor C11 acts to decouple noise.

If the sampled voltage is below the master reference, the output of the comparator U1B goes low and sets the latch output to low. As a result the output of NAND-gate U3A goes high which, as seen below, causes the lamp to turn off. The resistor 24 acts to increase the sensitivity of the battery sampling network.

In block B, the circuit is arranged to monitor the light intensity of the environment and cause the lamp to turn off when that intensity is above a certain level.

Referring to block C, gate U3B receives start signals, from block A, to switch on the lamp. A start delay circuit consists of a resistor R9, a capacitor C4 and a diode D2. Typically a 10 second start delay is provided by the delay circuit. However, the lamp can be turned off instantly by including the diode D2. A retriggerable timer consists of a resistor R16 and a capacitor C5. On receipt of a start signal, the output of an invertor U2B goes low and the output of an invertor U2D turns on a transistor Q2. At the same time, capacitor C3 begins to charge up via diode D4 (see block 4) and capacitor C5 charges up via resistor R16. As a result current passes via the transistor Q2, which acts as a switch to turn the current ON and OFF, through one of the lamp elements to warm up the element. Importantly in terms of embodiments of this invention the output of invertor U2C is acting at this time to inhibit the battery condition detecting circuit (block A) and increase the power that can be supplied by the lamp drive circuit to a maximum.

A sampling network consisting of resistors R4 and R5 monitors the back e.m.f. induced in the lamp. A low back e.m.f. indicates the lamp is stable at secondary breakdown region. A high back e.m.f. indicates the lamp is operating unstably. An invertor U2E is connected to the junction between the resistors R4 and R5. If the voltage at the junction rises above a predetermined threshold, corresponding to non-stable lamp operation, that is, corresponding to an operating condition of the lamp deteriorating to a predetermined condition, the output of invertor U2E goes low and so the retriggerable timer and the transistor Q2 are turned ON immediately. Thus, a restart condition is repeated, increasing power to the lamp and applying a current to the one of the lamp filaments. The sampling network thus automatically attempts to maintain the lamp in a stable working secondary breakdown condition; if the lamp is allowed to work under unstable conditions it will considerably shorten the life of the lamp.

The lamp is supplied with its main power by a close loop oscillator consisting basically of amplifiers U1D and U1C and invertor U2F, a Mosfet Q1 and a resistor R18. The oscillator converts the battery d.c. supply to a high energy high frequency current through a step-up pulse transformer T1. Oscillations can be stopped by supply through an invertor U2A and a biassing network consisting of resistors R1, R10 and R6 and a capacitor C2. The duty cycles are determined by the d.c. input level of amplifier U1D supplied via a network consisting of resistors R31, R32, R7 and R8 and a capacitor C6. The time constant of the oscillator is determined by a filter consisting of a resistor R17 and a capacitor C10. A high d.c. input level or a greater capacitance for capacitor C10 results in a longer ON cycle, or vice versa. The OFF duty cycle is determined by the time taken for a capacitor C1 to charge from $V_{ss}$ to $\frac{1}{3} V_{DD}$ in the network including resistors R2 and R3.

A hold circuit consists of diodes D4 and D7, a resistor R34 and a capacitor C3. When diode D4 is forward biassed and supplied from the block C, the output of invertor U2E goes low, the capacitor C3 fully charges almost instantaneously. Diode D7 will become forward biassed in turn and applies a voltage to increase an input voltage of the comparator U1B via nand gate U3C. As a result the output of the comparator U1B is held high. In other words, the comparator U1B is disabled. It would normally remain disabled until the supply from block C is removed. Capacitor C3 then discharges through the resistor R34 until the diode D7 is cut off and the comparator U1B is then again released to work normally. The hold circuit is designed to disenable the comparator U1B before the lamp becomes stable and for approximately 0.5 seconds thereafter. The circuit in block A is therefore disenabled during start-up and when the operating conditions deteriorate when maximum power is required to be drawn from the battery. If the circuit of block A is not disenabled the lamp supply may be cut-off by the normal operation of the circuit of block A.

When diode D3 is forward biassed as a result of the output of invertor U2C being high, the power to the lamp increases to three times normal. This condition applies during start up and when unstable operating conditions are detected, that is when the output of invertor U2E goes low. Normally, the deterioration in the operating condition occurs from time to time and is corrected automatically by the described drive circuit. However, if the lamp fails or the connections to the lamp are damaged, say, by a blow for example, the operating conditions themselves may be perceived as deteriorating but in fact they cannot be properly restored automatically. In such a situation increased power, in this case three times normal power, is then permanently supplied to the lamp and the battery will rapidly discharge and possibly discharge below a recovery level. To inhibit such a situation arising a thermistor TH1 is connected across the capacitor C6.

The thermistor TH1 is physically mounted on the Mosfet Q1 and its resistance will change if the Mosfot Q1 becomes hot; this will occur if extra power is supplied for more than a reasonably short period of time. As a result the duty cycle of the oscillator is automatically adjusted to decrease the power supplied by the circuit. The automatic control is provided by adding the thermistor TH1 so as to inhibit rapid and total discharging of the battery.

Another consequence of the diode D4 being forward biassed is that the normal operation of the circuit of block A as explained above is removed.

With the circuit of block as so far described, if some fault develops which the drive circuit cannot automatically correct, the battery may be discharged too much. A resistor R37 is provided which ensures that the comparator U1B is not disenabled if the voltage falls below a low threshold. Thus, the resistor R37 serves to inhibit the total discharging of the battery. Therefore, in the described arrangement the normal operation of the circuit of block A is retained so as to respond to any low voltage detections but which is inhibited and do not cut-off the power during start up and during temporary deteriorations of operating conditions. However, if the battery output terminal voltage falls below a lower threshold value the low voltage detection of block A is no longer totally inhibited by a supply from block C.

I claim:

1. A lamp drive circuit for connection between a battery power supply having solar cells and a battery and terminals of a fluorescent lamp comprising: an oscillator and a step-up transformer arranged to supply high frequency power across said terminals; a switch connected to control a warm up power supply to a filament of said lamp; a battery condition protection circuit to inhibit total discharging of said battery; a low voltage detecting circuit which normally isolates said battery to prevent further discharge if said battery voltage is low; and circuit means for canceling application of said low voltage detecting circuit during certain operations of said fluorescent lamp, said canceling means having a means for inhibiting said canceling means whenever the voltage of said battery falls below a predetermined lower value.

2. A lamp drive circuit for connection between a battery power supply having solar cells and a battery and terminals of a fluorescent lamp comprising: an oscillator and a step,up transformer arranged to supply high frequency power across said terminals; a switch connected to control a warm up power supply to a filament of said lamp; a battery condition protection circuit to inhibit total discharging of said battery, said battery condition protection circuit further comprising a thermistor physically adjacent a power carrying component of said oscillator such that said thermistor significantly increases in temperature whenever high power is being supplied for more than a short period of time, and in which said thermistor is connected to said oscillator to reduce power output automatically when said thermistor temperature rises significantly; and a low voltage detecting circuit which normally isolates said battery to prevent further discharge if said battery voltage is low; and circuit means for canceling application of said low voltage detecting circuit during certain operations of said fluorescent lamp, said canceling means having a means for inhibiting said canceling means whenever the voltage of said battery falls below a predetermined lower value.

* * * * *